(12) United States Patent
Barreirinhas (10) Patent No.: US 8,732,120 B1
(45) Date of Patent: May 20, 2014

(54) CONCURRENT EDITING OF LARGE GEOGRAPHIC DATA SETS (75) Inventor: Quarup S. Barreirinhas, San Francisco, CA (US)

(73) Assignee: Google, Mountain View, CA (US)

(*) Notice: Subject to any disclaimer, the term of this patent is extended or adjusted under 35 U.S.C. 154(b) by 60 days.

(21) Appl. No.: 13/434,143

(22) Filed: Mar. 29, 2012

(51) Int. Cl.
*G06F 17/30* (2006.01)
*G06F 7/00* (2006.01)

(52) U.S. Cl.
CPC ...... *G06F 17/30362* (2013.01); *G06F 17/3087* (2013.01); *G06F 17/30171* (2013.01)
USPC .......................................... 707/608; 707/793

(58) Field of Classification Search
CPC .................... G06F 17/30241; G06F 17/30312; G06F 17/30554
USPC .............................. 707/608, 793, 756; 705/14
See application file for complete search history.

(56) References Cited

U.S. PATENT DOCUMENTS 8,244,743 B2 * 8/2012 Gonzalez et al. ............. 707/756
8,589,425 B2 * 11/2013 Gonzalez et al. ............. 707/756
2003/0140769 A1 * 7/2003 Davis et al. ..................... 84/609
2004/0159216 A1 * 8/2004 Davis et al. ..................... 84/609
2008/0146245 A1 * 6/2008 Appaji ...................... 455/456.1
2008/0313039 A1 * 12/2008 Altberg et al. ................. 705/14

FOREIGN PATENT DOCUMENTS

WO   WO 2011133998 A1 * 11/2011

* cited by examiner

*Primary Examiner* — Jean M Corrielus
(74) *Attorney, Agent, or Firm* — Dority & Manning, PA (57) ABSTRACT

Systems, methods, and computer storage mediums are provided for collaboratively editing geographic features in a shared geographic database. An example method includes receiving a request from a first user to edit data associated with a plurality of geographic features geocoded within a first geographic area. The first geographic area is selected by the first user and defined by a first set of coordinates. The method then determines whether the first geographic area intersects a second geographic area. The second geographic area is selected by a second user and defined by a second set of coordinates. The intersection between the first and second sets of coordinates is determined by comparing the coordinates of the first and second geographic areas. When the first and second geographic areas do not intersect, the method locks the first geographic area to prevent other users from editing the geographic features geolocated within the first geographic area.

24 Claims, 4 Drawing Sheets

CONCURRENT EDITING OF LARGE GEOGRAPHIC DATA SETS

FIELD

The embodiments described herein generally relate to collaborative editing of shared data.

BACKGROUND

Geographic information systems allow users to download, view, and interact with geo-referenced data. The geo-referenced data may be provided to a user through a map or three-dimensional environment displayed on the user's computer system. The user may interact with the geo-referenced data by selecting geographic features, navigating around the map or through the three-dimensional environment, or selecting layers or sets of data for display. The geo-referenced data may be stored at a shared geographic database that is accessed by one or more geographic information servers. The shared geographic database may utilize a single database system or a collection of mirrored database systems.

BRIEF SUMMARY

The embodiments described herein include systems, methods, and computer storage mediums for collaboratively editing geographic features in a shared geographic database. An example method includes receiving a request from a first user to edit data associated with a plurafity of geographic features stored in the shared geographic database geocoded within a first geographic area. The first geographic area is selected by the first user and defined by a first set of coordinates. The method then determines whether the first geographic area intersects a second geographic area. The second geographic area is selected by a second user and defined by a second set of coordinates. The intersection between the first and second sets of coordinates is determined by comparing the coordinates of the first and second geographic areas. When the first and second geographic areas do not intersect, the method locks the first geographic area to prevent other users from editing the geographic features geolocated within the first geographic area.

System and computer program product embodiments are also disclosed.

Further features and advantages of the embodiments described herein, as well as the structure and operation of various embodiments, are described in detail below with reference to the accompanying drawings.

BRIEF DESCRIPTION OF THE DRAWINGS/FIGURES

Embodiments are described with reference to the accompanying drawings. In the drawings, like reference numbers may indicate identical or functionally similar elements. The drawing in which an element first appears is generally indicated by the left-most digit in the corresponding reference number.

DETAILED DESCRIPTION

The embodiments described herein allow multiple users to collaboratively edit geographic features in a shared geographic database. To edit geographic features within the shared geographic database, a user may select or otherwise define a geographic area. The geographic area is then compared against previously provided geographic areas that are being edited by other users. If the geographic area does not intersect another geographic area that is being edited, the geographic area will be locked and the user will be allowed to edit the geographic features that geocode within the geographic area.

In the following detailed description, references to "one embodiment," "an embodiment," "an example embodiment," etc., indicate that the embodiment described may include a particular feature, structure, or characteristic. Every embodiment, however, may not necessarily include the particular feature, structure, or characteristic. Thus, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

The following detailed description refers to the accompanying drawings that illustrate exemplary embodiments. Other embodiments are possible, and modifications can be made to the embodiments within the spirit and scope of this description. Those skilled in the art with access to the teachings provided herein will recognize additional modifications, applications, and embodiments within the scope thereof and additional fields in which embodiments would be of significant utility. Therefore, the detailed description is not meant to limit the embodiments described below.

This Detailed Description is divided into sections. The first section describes a diagram of multiple users collaboratively editing geographic features in a shared geographic database. The second and third sections describe example system and method embodiments, respectively, that may be used to collaboratively edit geographic features in a shared geographic database. The fourth section describes an example computer system that may be used to implement the embodiments described herein.

Example Collaborative Editing

Figure 1:
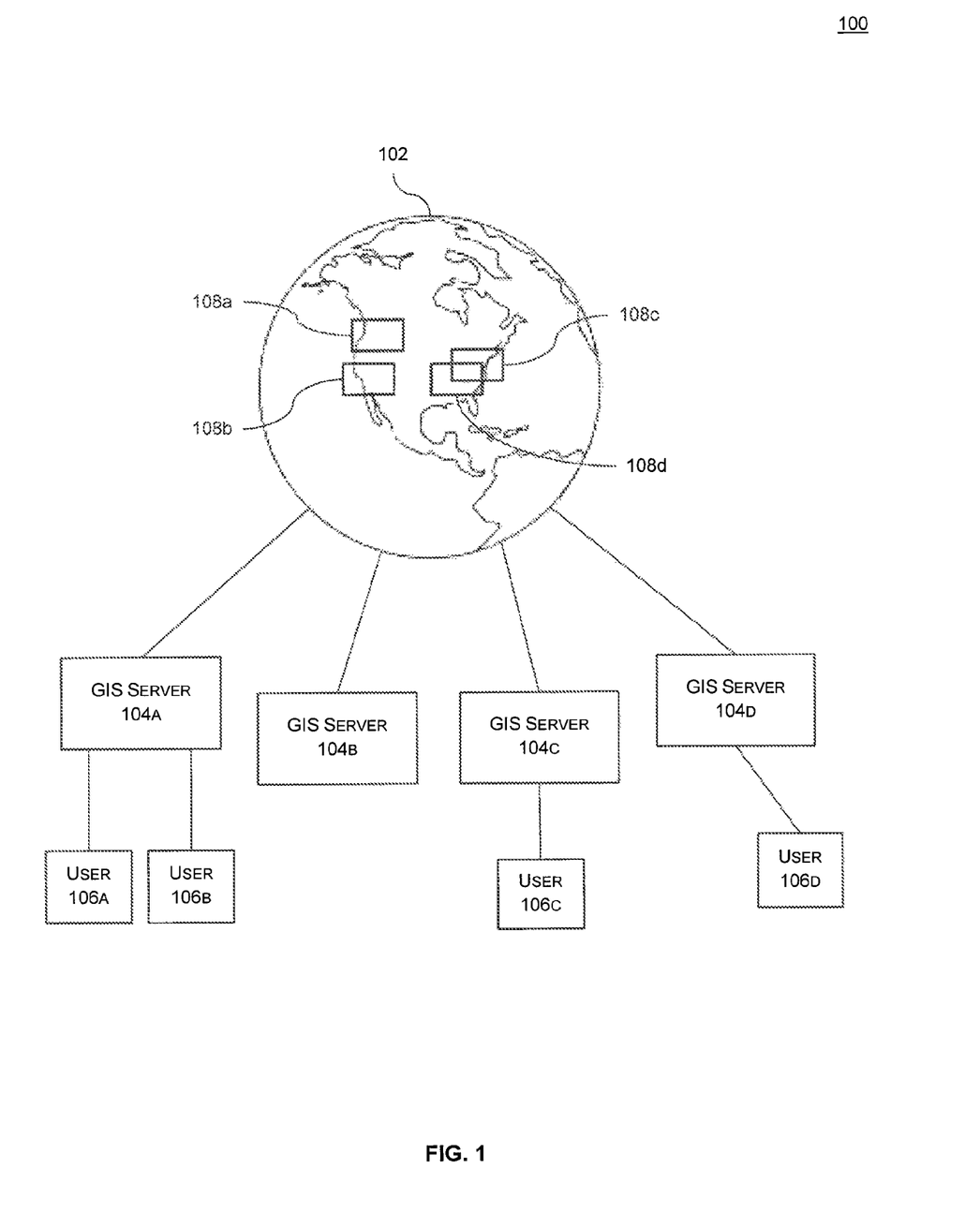
FIG. 1 illustrates a diagram of multiple users collaboratively editing geographic features in a shared geographic database.

FIG. 1 illustrates diagram 100 where multiple users are collaboratively editing geographic features in a shared geographic database. Diagram 100 includes shared geographic database 102, geographic areas 108a-d, GIS servers 104a-d, and users 106a-d. While shared geographic database 102 stores geo-referenced data related to the Earth, shared geographic database 102 may store geo-referenced data associated with other planetary bodies or portions of planetary bodies. The geo-referenced data may include, for example, maps, three-dimensional environments, geocoded photographs, geocoded layers that overlay on the maps or display within the three-dimensional environment, and geographic features such as, for example, navigable paths, buildings or structures, landmarks, or geographic formations.

Users 106a-d may access the geo-referenced data from shared geographic database 102 through any one of GIS servers 104a-d. In diagram 100, users 106a-b access shared geographic database 102 through GIS server 104a, user 106c accesses shared geographic database 102 though GIS server 104c, and user 106d accesses shared geographic database 102 though GIS server 104d. The geo-referenced data provided by shared geographic database 102 may be displayed to users 106a-d though any number of computing devices such as, for example, desktop computers, portable computers, tablet devices, smartphones, global positioning systems, or other computing devices.

If a user such as, for example, user 106a wishes to edit geographic features stored at shared geographic database 102, user 106a may select or otherwise define a geographic area such as, for example, geographic area 108a. The geographic area may be of any size and may be defined by a set of coordinates that includes an altitude range. Multiple users may select or define the geographic area. In diagram 100, for example, user 106b selected geographic area 108b, user 106c selected geographic area 108c, and user 106d selected geographic area 108d.

Once user 106a selects geographic area 108a, the set of coordinates defining geographic area 108a may be compared against the sets of coordinates that define geographic areas selected by other users such as, for example, geographic areas 108b-d. If geographic area 108a is determined to not intersect another geographic area, geographic area 108a may be locked and made available for editing by user 106a. User 106a may then edit the geographic features that geocode within geographic area 108a by, for example, adding, removing, or modifying one or more geographic features, adding, removing, or modifying the information associated with one or more geographic feature, or associated together one or more geographic features. These types of edits are provided as examples and are not intended to limit any of the embodiments. When the user completes editing the geographic features within geographic area 108a, geographic area 108a may be unlocked and made available to other users for editing.

In cases where a geographic area intersects one or more other geographic areas such as, for example, geographic areas 108c-d, one or more users associated with the geographic areas such as, for example, users 106c-d may be notified of the intersection. In some embodiments, the user that first selects the geographic area will be allowed to edit the geographic features that geocode within the geographic database while all other users will be notified that a portion of their selected geographic area is locked for editing by another. Geographic regions that are locked for editing may be provided to users and displayed along with the geo-referenced data.

Diagram 100 is provided as an example and is not intended to limit the embodiments described herein.

Example System Embodiments

Figure 2:
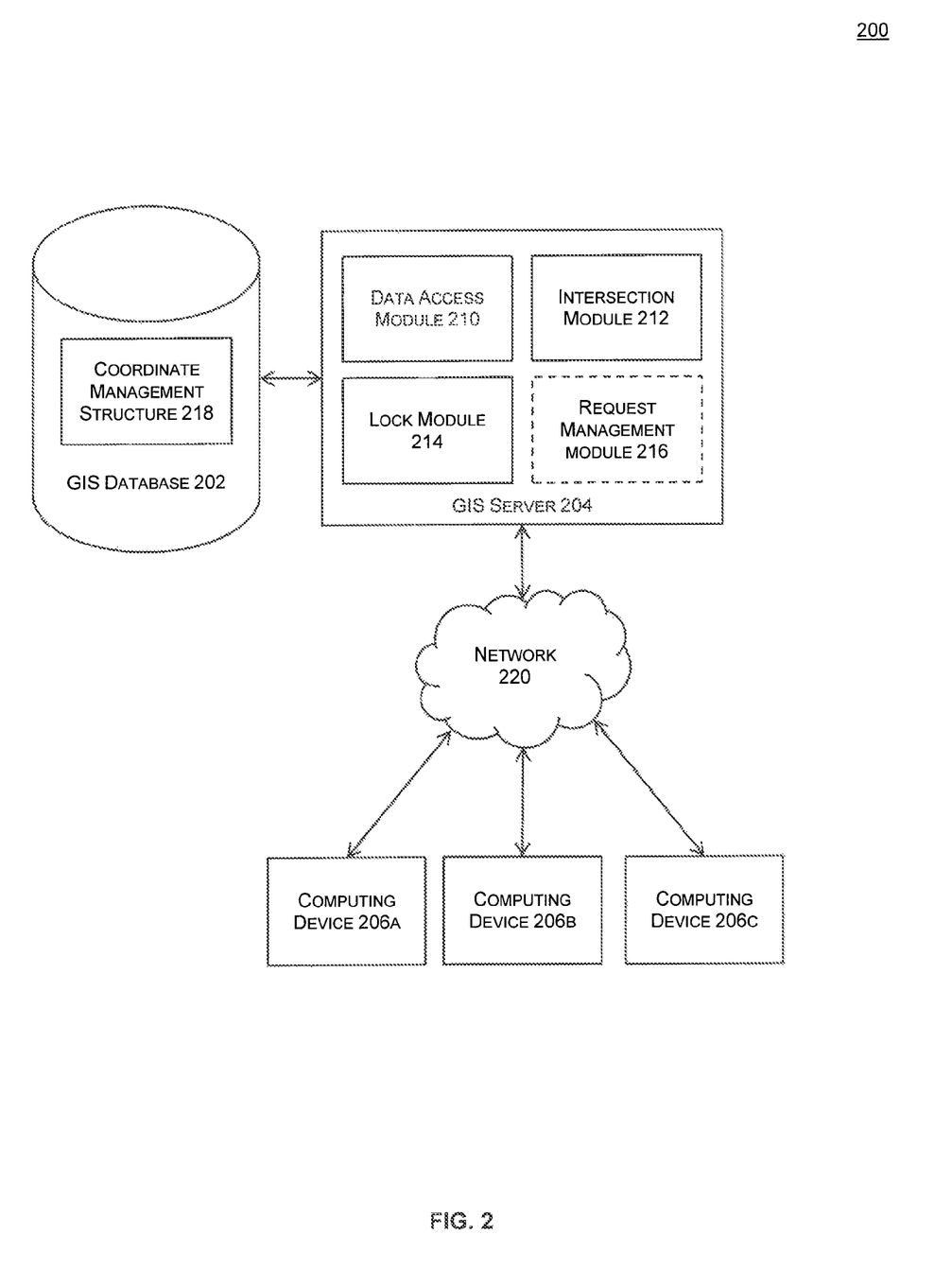
FIG. 2 illustrates a computer system that may be used to collaboratively edit geographic features in a shared geographic database.

FIG. 2 illustrates a computer system 200 that may be used to collaboratively edit geographic features in a shared geographic database. System 200 includes mobile GIS database 202, GIS server 204, network 220, and computing devices 206a-c. GIS server 204 includes data access module 210, intersection module 212, lock module 214, and request management module 216.

Network 220 may include any network or combination of networks that can carry data communication. These networks may include, for example, a local area network (LAN) or a wide area network (WAN), such as the Internet. LAN and WAN networks can include any combination of wired (e.g., Ethernet) or wireless (e.g., Wi-Fi, 3G, or 4G) network components.

Computing devices 206a-c may be implemented on any computing device capable of communicating with a GIS and displaying the geo-referenced data received from the GIS. Examples of these devices include a stationary computing device (e.g., a desktop computer) or a mobile computing device (e.g. a mobile phone, a smart phone, a personal digital assistant (PDA), a navigation device, a tablet or other mobile computing devices). These devices may also include, but are not limited to, a central processing unit, an application-specific integrated circuit, a compute, workstation, distributed computing system, computer cluster, embedded system, stand-alone electronic device, networked device, rack server, set-top box, or other type of computer system having at least one processor and memory.

A. GIS Server

GIS server 204 may be implemented using a single computer server system or a distributed network of computer server systems. Computer server systems may include computing devices with, for example, one or more central processing units, memory units, and/or application-specific integrated circuits. Examples of computer server systems may include a computer, a workstation, a distributed computing system, a computer cluster, an embedded system, a stand-alone electronic device, a networked device, a rack server, a set-top box, or another type of computer system having at least one processor and memory.

GIS server 204 may include any geographic information system capable of serving geo-referenced data. The geo-referenced data may include, for example, maps, satellite images, information layers, terrain data, three-dimensional globes, navigable paths, and any other type of geographic data. The geo-referenced data may be served using any number of communication protocols such as, for example, Hypertext Transfer Protocol ("HTTP"), Hypertext Transfer Protocol Secure ("HTTPS"), Web Map Service ("WMS"), Web Map Tile Service ("WMTS"), Web Feature Service ("WFS"), Web Coverage Service ("WCS"), Web Processing Service ("WPS"), or Web Catalog Service ("CWS").

The geo-referenced data is retrieved from a shared geographic database such as, for example, GIS database 202. The shared geographic database may be implemented by using a file storage application executed on GIS server 204, a stand-alone database server, or a network of database servers. The shared geographic database may include one or more groups of geographic features that may be edited by one or more users through one or more GIS servers. Each user may select a group or a portion of a group of geographic features to edit by selecting or defining a set of coordinates through data access module 210, as described below. The group of features may be stored in data file and each group of geographic features may be stored in one or more separate data file.

The set of coordinates defined by a user may be stored at coordinate management structure 218. Coordinate management structure 218 may be implemented as, for example, a table or other data structure maintained by the shared geographic database. Coordinate management structure 218 may be updated as users either define new sets of coordinates or complete the editing of geographic areas associated with stored sets of coordinates.

In some embodiments, coordinate management structure 218 may be used to indicate a lock stators for each stored set of coordinates. The lock status may be used to prevent other users from directly editing the data associated with the geographic features within a geographic area defined by a stored set of coordinates. For example, a first user selects a set of coordinates and is allowed to edit the data associated with a group of geographic features that fall within the set of coordinates. The data may be stored in a data file that stores data associated with other geographic features of the same type. If a second user selects a set of coordinates that overlaps the set of coordinates selected by the first user, the second user may be denied access to edit the geographic features within the second set of coordinates. Alternatively, the second user may be allowed to edit only the geographic features that fall within the second user's set of coordinates that are not already being edited by the first user. Consequently, the first and second user may be allowed to simultaneously modify the same data file as long as they are not editing the same data.

In some embodiments, coordinate management structure 218 may be used to track the data associated with the geographic features that is being modified by a user so that the modified data can be propagated to other users, GIS servers, or GIS databases. For example, a first user selects a set of coordinates and is allowed to edit the data associated with a group of geographic features that fall within the set of coordinates. The data may be stored in a data file that stores data associated with other geographic features of the same type. If a second user selects a set of coordinates that overlaps the set of coordinates selected by the first user, the second user may be allowed to edit the same data associated with geographic features being edited by the first user. A copy of the data selected may be provided to the second user or the second user may be directed to an alternate GIS server. Once the first and second users complete modification of the same data, differences between the same data may be presented to the first and second users for reconciliation. Alternatively, the differences between the same data may be propagated to users, GIS servers, and GIS databases based on when the data was last modified. In this way, coordinate management structure 218 may allow the geographic features to be edited indirectly.

While system 200 shows coordinate management structure 218 stored at GIS database 202, some embodiments may place coordinate management structure 218 at one or more GIS servers. In these embodiments, as one GIS server makes a change to its coordinate management structure, the change is sent to other GIS servers so each GIS server maintains the same data in its coordinate management structure.

The shared geographic database may be accessed through one or more user profiles or another security method known in the art. Each user profile may include privacy settings that indicate, for example, other users with whom data may be shared or the data that may be shared with the other users.

While system 200 shows only one GIS server 204, other embodiments may include multiple GIS servers that each provide access to a common shared geographic database. Additionally, while system 200 shows GIS server 204 including data access module 210, intersection module 212, lock module 214, and request management module 216 in the embodiment of system 200, a person of skill in the art will readily recognize that one or more of these modules may be implemented across one or more networked computer systems. Additionally, the functionality provided by each of the module listed above may be carried out by alternative modules or module configurations.

1. Data Access Module

Data access module 210 is configured to receive a request from a user to edit a set of data associated with a plurality of geographic features geocoded within a geographic area. Geographic features that geocode, or are located, within a geographic area may include many types such as, for example, navigable paths (e.g., road, waterway, trail, or railway), building or structures, places of business or other addresses, or landscape features (e.g., lakes, rivers, forests, or deserts). Geographic features may be categorized or organized into groups based on, for example, a subtype or geolocation. For example, places of business may be organized into subtypes such as restaurants, retail stores, or grocery stores, navigable paths may be organized into subtypes such as mode of travel, and buildings may be organized into subtypes based on a typical audience of interest such as tourists. Other organizational methods may be used depending on the type of the geographic feature.

The data associated with geographic features may be stored in a data file that can be simultaneously accessed by multiple users. The data may be categorized into one or more data files based on the type, subtype, or geolocation of the geographic features. The data file may be mirrored on each GIS server or GIS database. Thus multiple users may be allowed to simultaneously access the same data.

A geographic area may be selected by a user through a computing device such as, for example, any one of computing devices 206a-c. Each of computing devices 206a-c may include a browser or other application that displays geo-referenced data received from GIS server 204. The browser or application may allow a user to interact with the geo-referenced data and select or define a set of coordinates. The set of coordinates may be selected or defined by, for example, selecting a bounding box, polygon, circle, or other shape on a map or within a three-dimensional environment, selecting a geographic region such as, for example, a city, state, country, or continent, indicating a zip code or a postal code, selecting a specific geographic feature (e.g., a road or building), or by indicating the set of coordinates in any number of formats such as, for example, latitude/longitude format.

In some embodiments, the set of coordinates may also include altitude. Altitude may be indicated by, for example, using a three-dimensional shape when selecting a shape, including a default altitude range when selecting a geographic region, selecting one or more floors in a building when selecting a specific geographic feature, or adding an altitude range to the set of coordinates.

Once selected or defined, the set of coordinates may be provided to GIS server 204. GIS server 204 may receive and store sets of coordinates from multiple users. As each set of coordinates is received, it may be provided to the shared geographic database and stored in a management structure, as described above. In some embodiments, a set of coordinates may also be associated with the user through, for example, a user profile. If a user profile is utilized, the set of coordinates provided by each user may be shared with other users based on one or more privacy settings associated with the user's profile. The user profile may be implemented through, for example, the user profile used to access the shared geographic database or a separate user profile implemented by GIS server 204.

2. Intersection Module

Intersection module 212 is configured to determine whether a first geographic area intersects a second geographic area. Each of the first and second geographic areas are defined by a set of coordinates through data access module 210, as described above. The intersection between the first and second geographic areas may be determined by comparing the set of coordinates associated with the first geographic area with the set of coordinates associated with the second geographic areas. For example, the second set of coordinates may be stored at coordinate management structure 218 maintained by the shared geographic database. As the first set of coordinates is received by GIS server 204, intersection module 212 may retrieve locked sets of coordinates defined by other users that are stored at coordinate management structure 218 and compare the first set of coordinates with each set of coordinates, including the second set of coordinates. In some embodiments, intersection module 212 may provide the first set of coordinates to the shared geographic database whereby the shared geographic database will notify GIS server 204 if the first set of coordinates intersects a set of coordinates defined by another user. The shared geographic database may also provide the set(s) of coordinates that are intersected by the first set of coordinates.

In the embodiments where the sets of coordinates include altitude ranges, intersection module 212 may be configured to determine whether the altitude ranges included in the first and second geographic areas intersect. For example, as the first set of coordinates is received, intersection module 212 may only indicate an intersection with the second set of coordinates when the geographic areas and the altitude ranges defined by each of the first and second sets of coordinates intersect. This embodiment may be useful to allow multiple users to edit floors of the same building or structure.

3. Lock Module

Lock module 214 is configured to lock a geographic area associated with a set of data. In some embodiments, the lock prevents other users from editing the geographic features geolocated within the geographic area. Lock module 214 may lock a geographic area when, for example, the first and second geographic areas do not intersect. If intersection module 212 determines that a first geographic area received by GIS server 204 does not intersect a second geographic area defined by a set of coordinates stored at coordinate management structure 218, lock module 214 may lock the first geographic area by storing the set of coordinates defining the first geographic area at coordinate management structure 218.

In some embodiments, lock module 214 may also be configured to unlock a geographic area so that other users may edit the geographic features geolocated within the geographic area. For example, when a user completes editing the geographic features within a locked geographic area, lock module 214 may remove the set of coordinates defining the geographic area from coordinate management structure 218. This will unlock the geographic area and allow other users to select and lock the geographic area.

In some embodiments, the lock indicates the geographic features that are being edited by a user. Rather than preventing other users from directly modifying the data or data file associated with the geographic features being edited, some embodiments allow multiple users to edit the same data or data file at the same time. For these cases, any number of synchronization methods may be used to reconcile modified data. For example, if multiple users are allowed to edit the same data file but not the same data in the data file, the synchronization of the data will depend on whether the users are accessing the same data file or a copy of the same data file. If the same data file is being accessed, users may receive a notification when data within the file is editable. If copies of the same data file are being edited, modified data from one file may replace the unmodified data in a copy. The users' whose data file is modified may be notified of the update.

If, on the other hand, multiple users are allowed to edit the same data, each user may be provided with a copy of the data file or a subset of the data file. In some embodiments, as one user modifies the same data, all other users may be notified that a modification has been made. Each user may then be allowed to accept or reject the change. In other embodiments, as one user modifies the same data, the change may be automatically applied to other users based on a level of access privileges. In still other embodiments, if two or more users concurrently modify different portions of the same data, such as, for example, a name and a description of a business, the changes from each user may be accepted and merged automatically and provided to each user. These methods are provided as examples and are not intended to limit the methods that may be used for synchronizing data.

4. Request Management Module

Some embodiments may optionally include request management module 216. Request management module 216 may be configured to provide an indication to a user that a geographic area defined by the user is not editable. The indication may be provided when, for example, the geographic area intersects a geographic area that is locked and being edited by another user. The indication may be provided to the user through a message displayed at the user's computing device or by displaying or otherwise indicating the geographic areas that are currently being edited by other users.

In some embodiments, when a request to edit a first geographic area defined by a first user intersects one or more other geographic areas that are locked and being edited by other users, request management module 216 may be configured to pause the first user's request until the first geographic area becomes available for editing. The first user's request may be added to a queue and the user may be notified that that his request is paused and will be completed when the first geographic area becomes available for editing.

In some embodiments, when a first geographic area defined by a first user intersects one or more other geographic areas that are locked and being edited by other users, request management module 216 may be configured to adjust the first geographic area such that the first geographic area does not intersect any geographic area that is locked. The first geographic area may then be locked and made available to the first user for editing and the first user may be notified that the first geographic area was modified.

Various aspects of embodiments described herein can be implemented by software, firmware, hardware, or a combination thereof. The embodiments, or portions thereof, can also be implemented as computer-readable code. The embodiment in system 200 is not intended to be limiting in any way.

Example Method Embodiments

Figure 3:
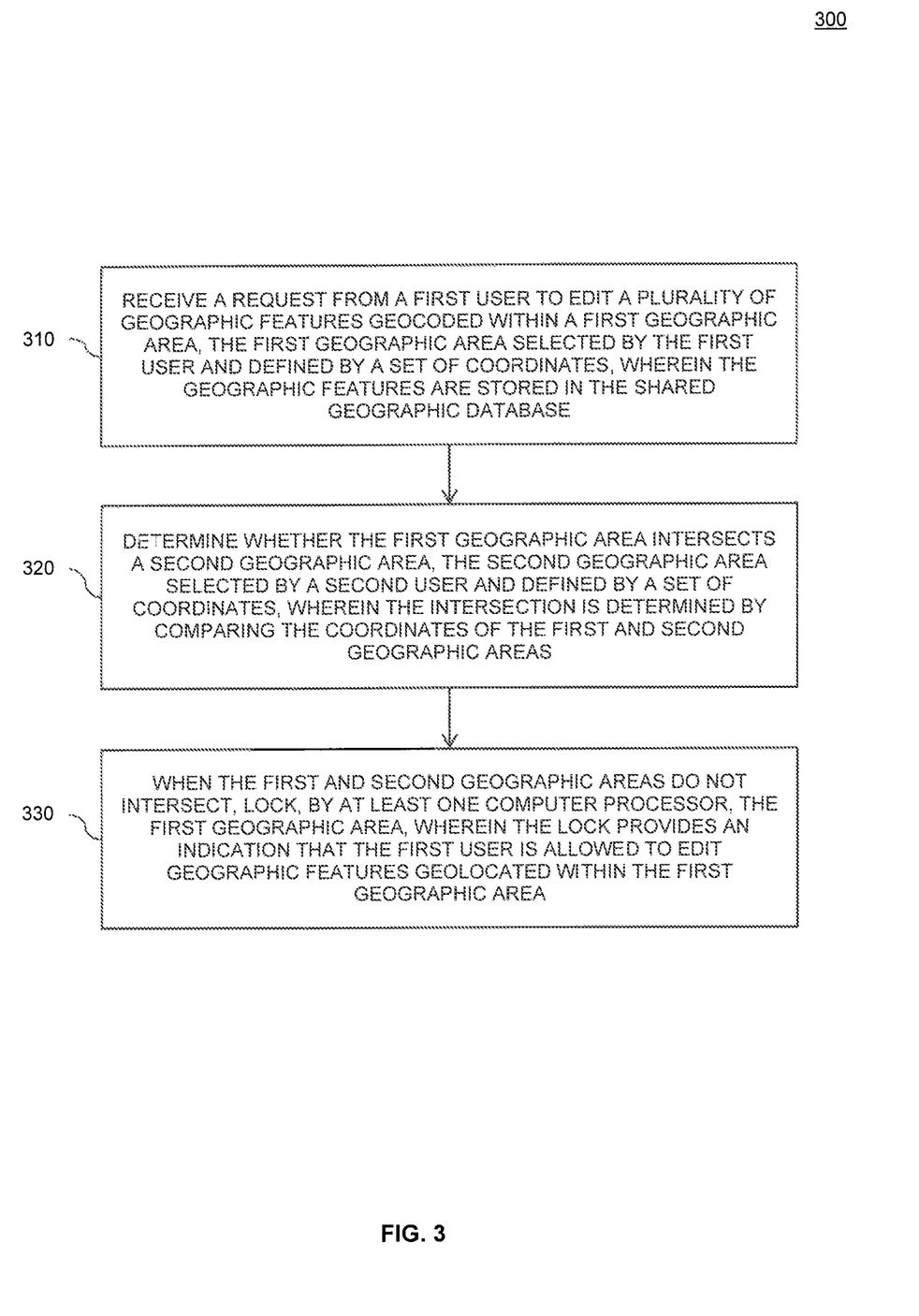
FIG. 3 is a flowchart illustrating a method that may be used to collaboratively edit geographic features in a shared geographic database.

FIG. 3 is a flowchart illustrating method 300, according to an embodiment, that may be used to allow multiple users to collaboratively edit geographic features in a shared geographic database. While method 300 is described with respect to an embodiment, method 300 is not meant to be limiting and may be used in other applications. Additionally, method 300 may be carried out by, for example, system 200.

Method 300 receives a request from a first user to edit a plurality of geographic features geocoded within a first geographic area (stage 310). The geographic features are stored in the shared geographic database that is provided to one or more users. The plurality of geographic features may include, for example, a set of geo-referenced data organized by type such as, for example, navigable paths (e.g., road, waterway, trail, or railway), buildings or structures, places of business or other addresses, or landscape features (e.g., lakes, rivers, forests, or deserts). Each type of geo-referenced data may be organized into groups or layers that may be provided to one or more users. A first user may select or define a first geographic area within one or more layers or groups of the geo-referenced data. The first geographic area may be defined by a first set of coordinates that optionally includes an altitude range. Stage 310 may be carried out by, for example, data access module 210 embodied in system 200.

Method 300 also determines whether the first geographic area intersects a second geographic area (stage 320). The second geographic area may be selected by a second user and is defined by a second set of coordinates. The second set of coordinates may be stored in a data structure or database managed by the shared geographic database. Alternatively, the second set of coordinates may be provided by a second user virtually simultaneously as the first set of coordinates. The intersection between the first and second geographic areas is determined by comparing the set of coordinates of the first geographic area with the set of coordinates of the second geographic area. In some embodiments, each of the first and second sets of coordinates may be in a different format. In this case, either the first or second sets of coordinates may be translated to the other format or both sets of coordinates may be translated to the same format.

In some embodiments, the first and second sets of coordinates may include an altitude range that may also be used to determine if the first and second geographic areas intersect. In this case, an intersection may occur, for example, when the geographic areas intersect despite different altitude ranges or when both the geographic areas and that altitude ranges intersect. Stage 320 may be carried out by, for example, intersection module 212 embodied in system 200.

When the first and second geographic areas do not intersect, method 300 locks the first geographic area (stage 330). The lock provides an indication that the first user is allowed to edit geographic features geolocated within the first geographic area. In some embodiments, the lock also prevents other users from editing the geographic features geolocated within the first geographic area. The lock may be established by adding the first set of coordinates defining the first geographic area to the database or data structure managed by the shared geographic database. Once the first geographic area is locked, the first user will be allowed to edit the geographic features that geocode within the first geographic area. Once the first user completes editing the first geographic area, the area may be unlocked by purging the first set of coordinates from the shared geographic database. Each geographic feature edited or modified by a user may be stored in the shared geographic database and provided to all other users. Stage 330 may be carried out by, for example, lock module 214 embodied in system 200.

Example Computer System

Figure 4:
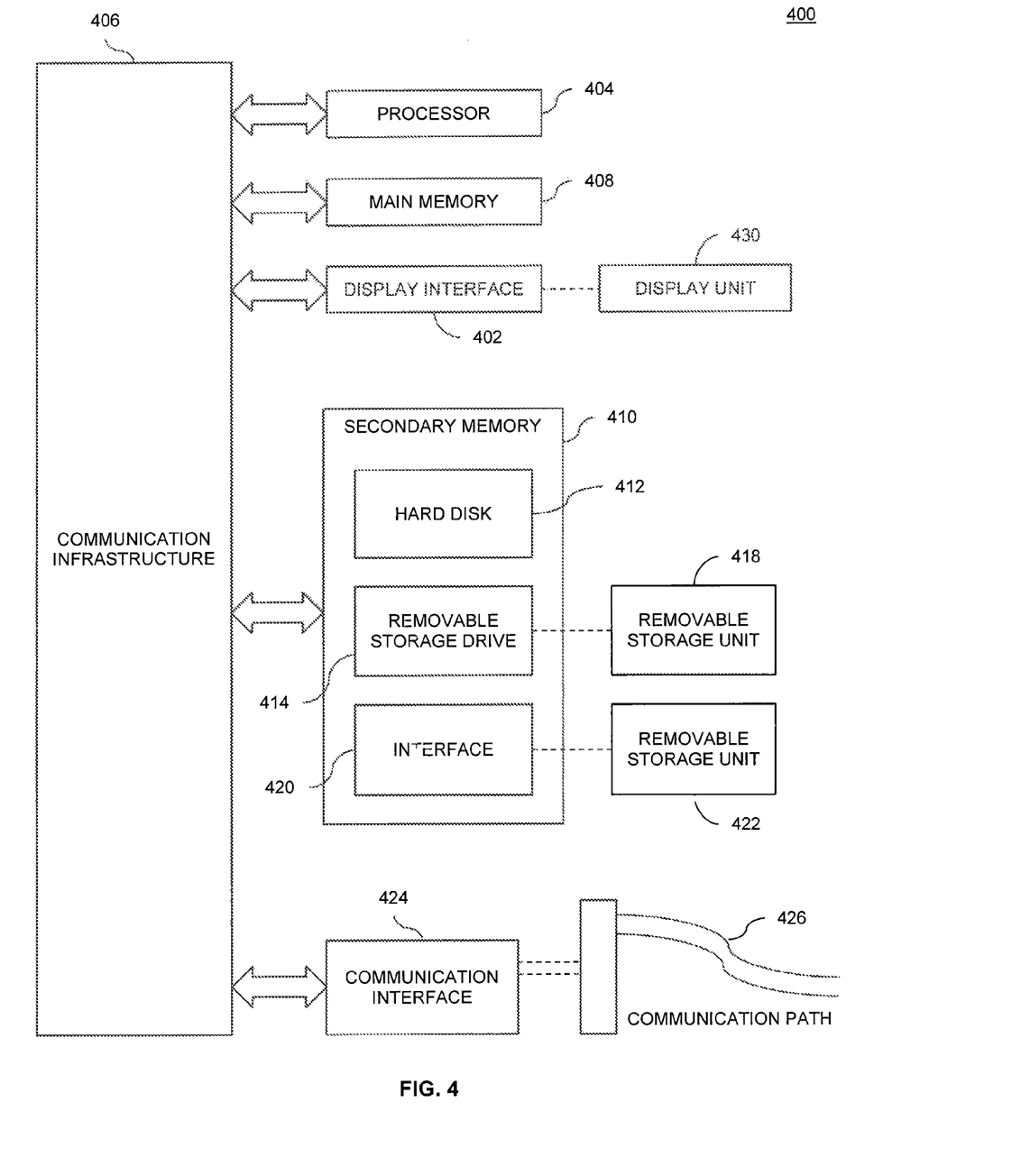
FIG. 4 illustrates an example computer in which embodiments of the present disclosure, or portions thereof, may be implemented as computer-readable code.

FIG. 4 illustrates an example computer system 400 in which embodiments of the present disclosure, or portions thereof, may be implemented. For example, data access module 210, intersection module 212, lock module 214, or request management module 216 may be implemented in computer systems 400 using hardware, software, firmware, computer readable storage media having instructions stored thereon, or a combination thereof.

One of ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, a computing device having at least one processor device and a memory may be used to implement the above described embodiments. A processor device may be a single processor, a plurality of processors, or combinations thereof. Processor devices may have one or more processor "cores."

Various embodiments are described in terms of this example computer system 400. After reading this description, it will become apparent to a person skilled in the relevant art how to implement the invention using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

As will be appreciated by persons skilled in the relevant art, processor device 404 may be a single processor in a multi-core/multiprocessor system, such system operating alone, or in a cluster of computing devices operating in a cluster or server farm. Processor device 404 is connected to a communication infrastructure 406, for example, a bus, message queue, network, or multi-core message-passing scheme. Computer system 400 may also include display interface 402 and touch-screen display unit 430.

Computer system 400 also includes a main memory 408, for example, random access memory (RAM), and may also include a secondary memory 410. Secondary memory 410 may include, for example, a hard disk drive 412, and removable storage drive 414. Removable storage drive 414 may include a floppy disk drive, a magnetic tape drive, an optical disk drive, a flash memory drive, or the like. The removable storage drive 414 reads from and/or writes to a removable storage unit 418 in a well-known manner. Removable storage unit 418 may include a floppy disk, magnetic tape, optical disk, flash memory drive, etc. which is read by and written to by removable storage drive 414. As will be appreciated by persons skilled in the relevant art, removable storage unit 418 includes a computer readable storage medium having stored thereon computer software and/or data.

In alternative implementations, secondary memory 410 may include other similar means for allowing computer programs or other instructions to be loaded into computer system 400. Such means may include, for example, a removable storage unit 422 and an interface 420. Examples of such means may include a program cartridge and cartridge interface (such as that found in video game devices), a removable memory chip (such as an EPROM, or PROM) and associated socket, and other removable storage units 422 and interfaces 420 which allow software and data to be transferred from the removable storage unit 422 to computer system 400.

Computer system 400 may also include a communications interface 424. Communications interface 424 allows software and data to be transferred between computer system 400 and external devices. Communications interface 424 may include a modem, a network interface (such as an Ethernet card), a communications port, a PCMCIA slot and card, or the like. Software and data transferred via communications interface 424 may be in the form of signals, which may be electronic, electromagnetic, optical, or other signals capable of being received by communications interface 424. These signals may be provided to communications interface 424 via a communications path 426. Communications path 426 carries signals and may be implemented using wire or cable, fiber optics, a phone line, a cellular phone link, an RF link or other communications channels.

In this document, the terms "computer storage medium" and "computer readable storage medium" are used to generally refer to media such as removable storage unit 418, removable storage unit 422, and a hard disk installed in hard disk drive 412. Computer storage medium and computer readable storage medium may also refer to memories, such as main memory 408 and secondary memory 410, which may be memory semiconductors (e.g. DRAMs, etc.).

Computer programs (also called computer control logic) are stored in main memory 408 and/or secondary memory 410. Computer programs may also be received via communications interface 424. Such computer programs, when executed, enable computer system 400 to implement the embodiments described herein. In particular, the computer programs, when executed, enable processor device 404 to implement the processes of the embodiments, such as the stages in the methods illustrated by flowchart 300 of FIG. 3, discussed above. Accordingly, such computer programs represent controllers of computer system 400. Where an embodiment is implemented using software, the software may be stored in a computer storage medium and loaded into computer system 400 using removable storage drive 414, interface 420, and hard disk drive 412, or communications interface 424.

Embodiments of the invention also may be directed to computer program products including software stored on any computer readable storage medium. Such software, when executed in one or more data processing device, causes a data processing device(s) to operate as described herein. Examples of computer readable storage mediums include, but are not limited to, primary storage devices (e.g., any type of random access memory) and secondary storage devices (e.g., hard drives, floppy disks, CD ROMS, ZIP disks, tapes, magnetic storage devices, and optical storage devices, MEMS, nanotechnological storage device, etc.).

CONCLUSION

The Summary and Abstract sections may set forth one or more but not all exemplary embodiments as contemplated by the inventor(s), and thus, are not intended to limit the present invention and the appended claims in any way.

The foregoing description of specific embodiments so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments.

What is claimed is:

1. A computer-implemented method for collaboratively editing geographic features in a shared geographic database comprising:
    receiving, by at least one computer processor, a request from a first user to edit data associated with a plurality of geographic features geocoded within a first geographic area, the first geographic area selected by the first user and defined by a set of coordinates, wherein the data associated with the geographic features is stored in the shared geographic database;
    determining, by at least one computer processor, whether the first geographic area intersects a second geographic area, the second geographic area selected by a second user and defined by a set of coordinates, wherein the intersection is determined by comparing the coordinates of the first and second geographic areas;
    when the first and second geographic areas do not intersect, locking, by at least one computer processor, the first geographic area, wherein locking the first geographic area provides an indication that the first user is allowed to edit the data associated with the geographic features geolocated within the first geographic area to enable collaboratively editing geographic features in a shared geographic database.

2. The computer-implemented method of claim 1, further comprising:
    when the first and second geographic areas intersect and the second geographic area is locked, providing an indication to the first user that the first geographic area is not editable.

3. The computer-implemented method of claim 1, farther comprising:
    when the first and second geographic areas intersect and the second geographic area is locked, pausing the request from the first user until the second geographic area is unlocked; and providing an indication to the first user that request is paused.

4. The computer-implemented method of claim 1, further comprising:
    when the first and second geographic areas intersect and the second geographic area is locked, adjusting the first geographic area such that the first geographic area does not intersect the second geographic area; and locking the adjusted first geographic area to prevent other users from editing the geographic features geolocated within the adjusted first geographic area.

5. The computer-implemented method of claim 1, further comprising:
    when the first and second geographic areas intersect and the second geographic area is locked, receiving modified data from the first user, wherein the modified data is associated with a geographic feature geolocated where the first and second geographic area overlap; and notifying the second user that data within the second geographic area was modified.

6. The computer-implemented method of claim 1, further comprising:
    when the first and second geographic areas intersect and the second geographic area is locked, receiving modified data from the first user, wherein the modified data is associated with a geographic feature geolocated where the first and second geographic area overlap; and providing the modified data to the second user such that the modified data replaces the second user's unmodified data.

7. The computer-implemented method of claim 1, further comprising:
    when the first and second geographic areas intersect and the second geographic area is locked, receiving a first modified data from the first user and a second modified data from the second user, wherein the first and second modified data is associated with the same geographic feature; providing the first and second modified data to the first and second users; accepting one of the first or second modified data based at least in part on input received from the first and second users.

8. The computer-implemented method of claim 1, further comprising:
when the first and second geographic areas intersect and the second geographic area is locked, receiving a first modified data from the first user and a second modified data from the second user, wherein the first and second modified data is associated with the same geographic feature; accepting one of the first or second modified data based at least in part on a difference between user access rights associated with each of the first and second users.

9. The computer-implemented method of claim 1, wherein the shared geographic database is distributed among a plurality of servers, and further comprising:
when the first and second geographic areas do not overlap, notifying the plurality of servers that the first geographic area is locked.

10. The computer-implemented method of claim 1, wherein the coordinates of the first and second geographic areas include an altitude range; and wherein determining whether the first and second geographic areas overlap includes determining whether the altitudes ranges included, in the first and second geographic areas intersect.

11. The computer-implemented method of claim 10, wherein the shared geographic database includes data defining a building, and wherein the first geographic area includes a floor in the building.

12. The computer-implemented method of claim 1, wherein a geographic feature includes a navigable path, a building, a place of business, or a landscape feature.

13. A computer system for collaboratively editing geographic features in a shared geographic database comprising:
at least one computer processor;
at least one memory unit;
a data access module, stored at the at least one memory unit and executed by the at least one computer processor, configured to receive a request from a first user to edit data associated with a plurality of geographic features geocoded within a first geographic area, the first geographic area selected by the first user and defined by a set of coordinates, wherein the data associated with the geographic features is stored in the shared geographic database;
an intersection module, stored at the at least one memory unit and executed by the at least one computer processor, configured to determine whether the first geographic area intersects a second geographic area, the second geographic area selected by a second user and defined by a set of coordinates, wherein the intersection is determined by comparing the coordinates of the first and second geographic areas; and
a lock module, stored at the at least one memory unit and executed by the at least one computer processor, configured to, when the first and second geographic areas do not intersect, lock the first geographic area, wherein locking the first geographic area provides an indication that the first user is allowed to edit the data associated with the geographic features geolocated within the first geographic area to enable collaboratively editing geographic features in a shared geographic database.

14. The computer system of claim 13, further comprising:
a request management module, stored at the at least one memory unit and executed by the at least one computer processor, configured to, when the first and second geographic areas intersect and the second geographic area is locked, provide an indication to the first user that the first geographic area is not editable.

15. The computer system of claim 13, further comprising:
a request management module, stored at the at least one memory unit and executed by the at least one computer processor, configured to, when the first and second geographic areas intersect and the second geographic area is locked:
pause the request from the first user until the second geographic area is unlocked; and
provide an indication to the first user that request is paused.

16. The computer system of claim 13, farther comprising:
a request management module, stored at the at least one memory unit and executed by the at least one computer processor, configured to, when the first and second geographic areas intersect and the second geographic area is locked:
adjust the first geographic area such that the first geographic area does not intersect the second geographic area; and
lock the adjusted first geographic area to prevent other users from editing the geographic features geolocated within the adjusted first geographic area.

17. The computer system of claim 13, wherein the lock module is further configured to:
when the first and second geographic areas intersect and the second geographic area is locked, receive modified data from the first user, wherein the modified data is associated with a geographic feature geolocated where the first and second geographic area overlap; and notify the second user that data within the second geographic area was modified.

18. The computer system of claim 13, wherein the lock module is further configured to:
when the first and second geographic areas intersect and the second geographic area is locked, receive modified data from the first user, wherein the modified data is associated with a geographic feature geolocated where the first and second geographic area overlap; and provide the modified data to the second user such that the modified data replaces the second user's unmodified data.

19. The computer system of claim 13, wherein the lock module is further configured to:
when the first and second geographic areas intersect and the second geographic area is locked, receive a first modified data from the first user and a second modified data from the second user, wherein the first and second modified data is associated with the same geographic feature; provide the first and second modified data to the first and second users; accept one of the first or second modified data based at least in part on input received from the first and second users.

20. The computer system of claim 13, wherein the lock module is further configured to:
when the first and second geographic areas intersect and the second geographic area is locked, receive a first modified data from the first user and a second modified data from the second user, wherein the first and second modified data is associated with the same geographic feature; accept one of the first or second modified data based at least in part on a difference between user access rights associated with each of the first and second users.

21. The computer system of claim 13, wherein the shared geographic database is distributed among a plurality of servers, and wherein the intersection module is further configured to, when the first and second geographic areas do not overlap, notify the plurality of servers that the first geographic area is locked.

22. The computer system of claim 13, wherein the coordinates of the first and second geographic areas include an altitude range; and wherein the intersection module is further configured to determine whether the altitudes ranges included in the first and second geographic areas intersect.

23. The computer system of claim 22, wherein the shared geographic database includes data defining a building, and wherein the first geographic area includes a floor in the building.

24. The computer system of claim 13, wherein a geographic feature includes a navigable path, a building, a place of business, or a landscape feature.

* * * * *

UNITED STATES PATENT AND TRADEMARK OFFICE
CERTIFICATE OF CORRECTION

| | | |
|---|---|---|
| PATENT NO. | : 8,732,120 B1 | Page 1 of 1 |
| APPLICATION NO. | : 13/434143 | |
| DATED | : May 20, 2014 | |
| INVENTOR(S) | : Barreirinhas | |

It is certified that error appears in the above-identified patent and that said Letters Patent is hereby corrected as shown below:

In the Claims

Column 12, line 24, claim 3, please delete the word "farther" and insert the word --further--

Column 14, line 12, claim 16, please delete the word "farther" and insert the word --further--

Signed and Sealed this
Eighteenth Day of November, 2014

Michelle K. Lee
*Deputy Director of the United States Patent and Trademark Office*